(12) United States Patent
Niimi et al.

(10) Patent No.: US 6,570,283 B2
(45) Date of Patent: May 27, 2003

(54) ROTARY ELECTRIC MACHINE

(75) Inventors: Masami Niimi, Handa (JP); Yasuyuki Wakahara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/731,861

(22) Filed: Dec. 8, 2000

(65) Prior Publication Data

US 2001/0045784 A1 Nov. 29, 2001

(30) Foreign Application Priority Data

Dec. 9, 1999 (JP) ............................... 11-349708

(51) Int. Cl.⁷ .................................................. H02K 5/12
(52) U.S. Cl. ............................. 310/85; 310/89; 310/43
(58) Field of Search ............................. 310/85, 90, 89, 310/43, 42; 384/477, 489

(56) References Cited

U.S. PATENT DOCUMENTS

| | | | |
|---|---|---|---|
| 2,462,172 A | * 2/1949 | Esarey | 172/36 |
| 2,564,307 A | * 8/1951 | Keiser | 308/166 |
| 3,483,409 A | * 12/1969 | Phillips | 310/90 |
| 3,670,405 A | * 6/1972 | Dochterman | 29/596 |
| 3,734,579 A | 5/1973 | Schumacher | |
| 4,245,870 A | * 1/1981 | Punshon et al. | 308/36 |
| 4,449,622 A | * 5/1984 | Okano et al. | 192/84 C |
| 5,711,618 A | 1/1998 | Waskiewicz | |

FOREIGN PATENT DOCUMENTS

| | | |
|---|---|---|
| DE | 43 24 912 | 1/1995 |
| FR | 1.549.520 | 12/1968 |
| FR | 2.218.010 | 9/1974 |
| JP | 60-38063 | 3/1985 |

* cited by examiner

Primary Examiner—Thanh Lam
(74) Attorney, Agent, or Firm—Oliff & Berridge, PLC

(57) ABSTRACT

A rotary electric machine includes a frame having a bearing box at a rear center thereof, a stator fixed to the frame, a rotor disposed inside the frame to be rotatable inside stator, a bearing fitted to the bearing box to support a rear portion of a rotor shaft, and a bearing cover fitted to the bearing box. The bearing cover is a rubber-made cup-shaped member having a hollow cylindrical portion, a plurality of ring-shaped projections around the cylindrical portion and a waterproofing bottom.

8 Claims, 3 Drawing Sheets

ROTARY ELECTRIC MACHINE

CROSS REFERENCE TO RELATED APPLICATION

The present application is based on and claims priority from Japanese Patent Application Hei 11-349708 filed on Dec. 9, 1999, the contents of which are incorporated herein by reference.

BACKGROUND OF THE INVENTION

1. Field of the Invention

The present invention relates to a rotary electric machine such as a motor or a generator.

2. Description of the Related Art

JP-U-60-38063 discloses a DC motor as a rotary electric machine.

This rotary electric machine includes a frame having a concave bearing box at the rear center thereof, a stator fixed to the frame and a rotor that is disposed inside the frame and rotatably supported thereby. A bearing is fitted to the inside of the bearing box to support the rear portion of the rotor shaft. A bearing cover, which is called as a dust-proof cap, is fitted to the bearing box to cover the rear portion of the bearing.

From the drawings, it is presumed that this bearing cover together with rear frame is made of metal and, provably, steel. In other words, the bearing cover is a unitary member having a disk-shaped bottom and a short hollow cylindrical portion that is mechanically extended from the outer periphery of the bottom. The bearing cover is pressed into the back of the bearing box to close the open end of the bearing box.

However, the above metal bearing cover is force-fitted to the bearing box of the rear frame. Therefore, a permissible dimensional deviation of the outside diameter of the bearing cover is required to be very small, resulting in a high production cost.

Further, because of the metal-to-metal force fitting, the contact surfaces thereof may be easily scratched, thereby, to allow water into the inside bearing cover.

It is necessary to remove the bearing cover whenever the bearing is replaced. Because the bearing cover is force-fitted into the bearing box, it is not easy and takes time to remove the bearing cover. Moreover, the end frame may be damaged during the difficult removing work of the bearing cover. Therefore, such a bearing cover once removed is not so easy to use again. Even if it can be used again, the working cost may be too high.

SUMMARY OF THE INVENTION

A main object of the invention is to provide a rotary electric machine having a waterproof and readily removable bearing cover that can be used again.

According to a feature of the invention, a bearing cover that is fitted to a bearing box is a cup-shaped unitary member made of rubber. The bearing cover has a hollow cylindrical portion, a plurality of ring-shaped projections on the periphery thereof and a bottom for sealing or closing the open end of the hollow cylindrical portion.

The bearing cover is inserted into the back of the bearing box after the bearing. The bearing cover is a mold of an elastic material that can be fitted or inserted into the bearing box by hand. The bearing cover can be easily removed from the bearing cover by hand, or a screwdriver if necessary. If a knob is formed on the bearing cover, it can be removed more easily.

Because the material of the bearing cover is rubber or soft resin, the permissible dimensional deviation of the outside diameter of the bearing cover can be made rather large, thereby reducing the production cost. Even a small gap may not form between the bearing cover and the bearing box.

Because a plurality of elastic ring-shaped projections contacts the inner periphery of the bearing box, the bearing box is completely waterproofed.

When the bearing cover is removed from the bearing box to replace the bearing, it is easy to form gaps between the light and elastic ring-shaped projections and the inner periphery of the bearing box. Therefore, a screw driver can be inserted into one of the gaps easily, and the bearing cover can be easily removed in a very short time. As a result, no scratch may form on the bearing box, and the bearing cover once removed can be used again.

In the meantime, "backward" means an axial direction of the rotary electric machine in that the bearing box opens. It is opposite to the direction in that the rotor shaft extends "forward" from the frame.

According to another feature of the invention, a plurality of ring-shaped projections inclines backward. When the bearing cover is fitted to the bearing box, the outer periphery of the plurality of the ring-shaped projections easily contracts. Therefore, a small pressure is only necessary to fit the bearing cover into the bearing box. On the other hand, the outer periphery of the ring-shaped projections expands when the bearing cover is pulled in the removing direction or backward. Therefore, the bearing cover is not easy to remove.

If the bearing box with the bearing cover being fitted therein is vibrated, the inclined ring-shaped projections urge the bearing cover forward (deeper in the bearing box). Therefore, the bearing cover is prevented from dropping out of the bearing box. If the internal pressure of the rotary electric machine increases to push the bearing cover backward, the ring-shaped projections retain the bearing cover securely.

According to another feature of the invention, the bottom of the bearing box is thinner than the peripheral wall of the hollow cylindrical portion. In addition, because the bearing box is made of an elastic material, the bottom expands as the internal pressure of the bearing box increases so as to absorb the increased internal pressure.

According to another feature of the invention, the bearing cover has a knob that projects backward. Therefore, it is possible to easily remove the bearing cover from the bearing box with the knob being pulled by hand or a tool. Accordingly, not only the bearing cover is easy to remove but also the bearing cover and the bearing box are protected from damages.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The embodiments and variation of the embodiment are described with reference to the appended drawings.

Figure 1:
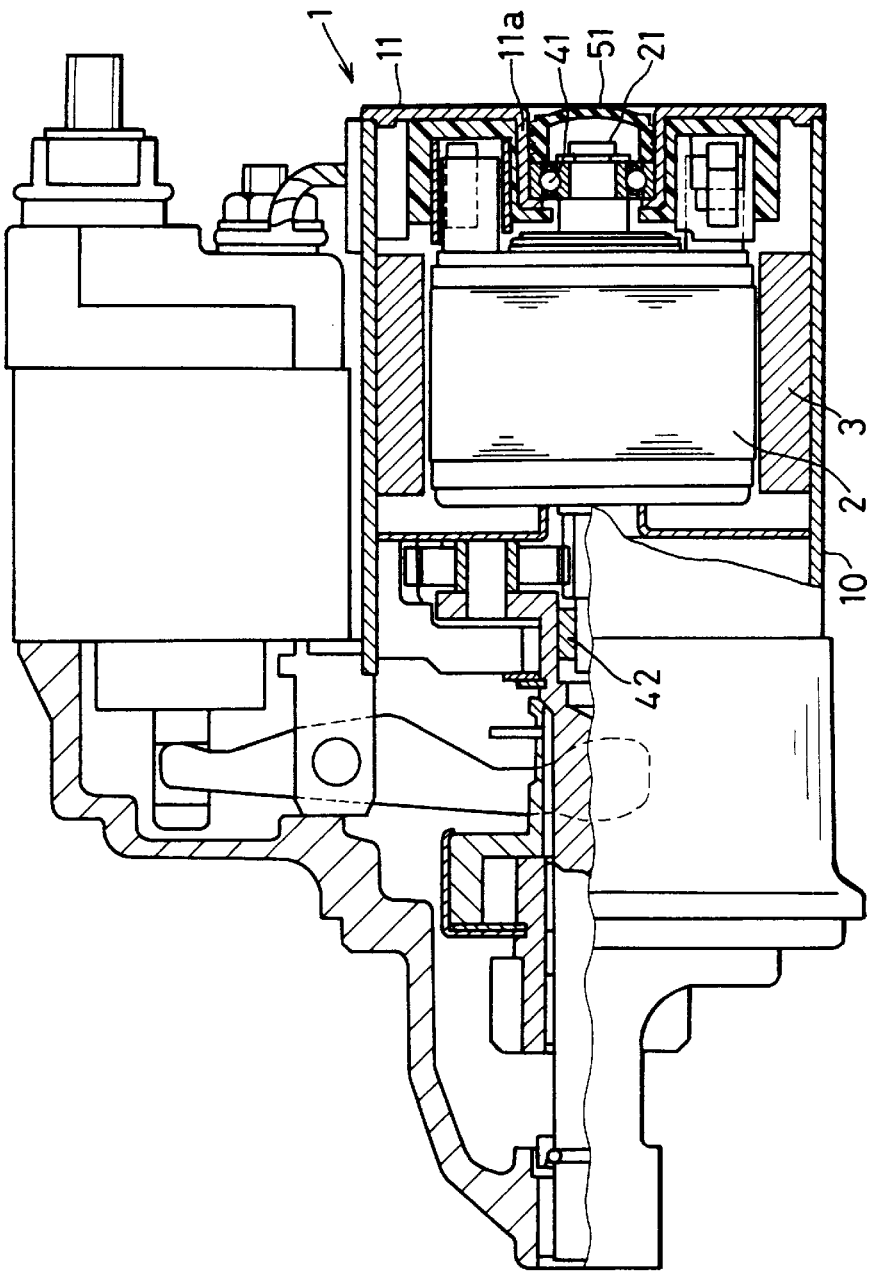
FIG. 1 is a partial cross-sectional view illustrating the whole structure of a starter motor according to a first embodiment of the invention.

A rotary electric machine according to a first embodiment of according to the first embodiment is a starter motor 1 of a starter for starting an engine of a vehicle shown in FIG. 1.

Starter motor 1 includes steel frame 10, stator 3 that is fixed to frame 10, and rotor 2 that is rotatably supported by a shaft inside frame 10. Frame 10 includes rear frame 11 disposed at the rear portion thereof. Rear frame 11 has cylindrical concave bearing box 11a at the center thereof.

Figure 2:
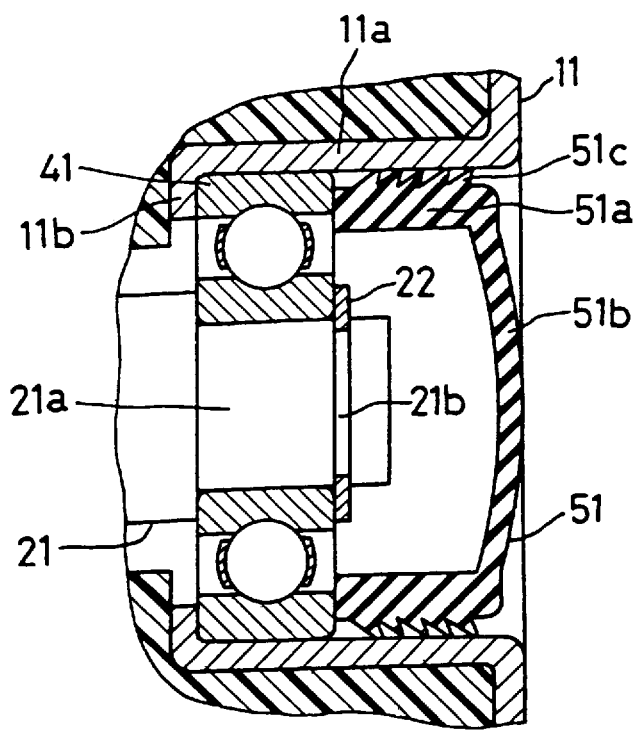
FIG. 2 is a cross-sectional view of a main portion of the starter motor according to the first embodiment 1.

Starter motor 1 has bearing 41 fitted into bearing box 11a to support the rear portion of armature shaft 21 of rotor 2 and bearing cover 51 that is fitted into bearing box 11a to cover the rear portion of bearing 41. In other words, armature shaft 21 is rotatably supported by oil-less bearing 42 at the front portion thereof and by ball bearing 41 at the rear small-diameter-portion 21a (shown in FIG. 2) thereof.

Bearing box 11a is a press-formed cylindrical hollow member. Bearing box 11a has ring-shaped bottom 11b at the front end thereof. Ball bearing 41 and bearing cover 51 are force-fitted to bearing box 11a to be disposed side by side. In other words, ball bearing 41 is force-fitted by a press-fitting tool until it abuts ring-shaped bottom 11b, and bearing cover 51 is fitted therein to abut ball bearing 41 under a comparatively small pressure. Bearing cover 51 seals or closes the rear opening of bearing box 11a so as to prevent water and foreign particles.

Bearing cover 51 is a unitary rotation symmetrical cup-shaped member made of nitrile rubber or chloroprene rubber. Rubber-made cover 51 is oil-resistant and heat-resistant.

Bearing cover 51 has hollow cylindrical portion 51a, five even-spaced stratified ring-shaped projections 51c, and bottom portion 51b that closes the rear opening of hollow cylindrical portion 51a. The front edge of hollow cylindrical portion 51a abuts the rear surface of the outer ring of bearing 41. On the other hand, five ring-shaped projections 51c abut the inner surface of bearing box 11a at the edges thereof under a suitable pressure of the rubber elasticity. The thickness of bottom portion 51b is thinner than the thickness of the peripheral wall of cylindrical hollow portion 51a.

Figure 3:
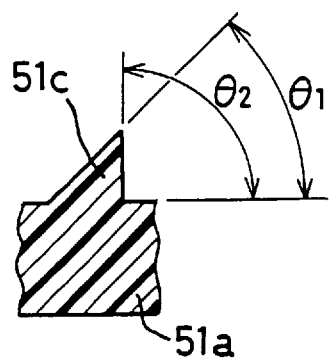
FIG. 3 is a fragmentary cross-sectional view illustrating a ring-shaped projection of a bearing cover according to the first embodiment.

Each ring-shaped projection 51c inclines backward, as shown in FIG. 3. In other words, each ring-shaped projection 51c has an opening-side surface of 90° (θ2) and a bearing-side conical surface of 45° (θ1). Thus, the cross-section of each ring-shaped projection 51c forms a triangle having a backward inclining side.

Because bearing cover 51 is force fitted into bearing box 11a, the edge of ring-shaped projection 51c bends and closely contacts the inner periphery of bearing box 11a.

When starter motor 1 is assembled, bearing cover 51 can be fitted very easily. It is only necessary to press it into bearing box 11a by hand.

While bearing cover 51 is being force-fitted into bearing box 11a, ring-shaped projections 51c bend. Therefore, it is not necessary to use strong power or to do sophisticated works. There is little chance of forming scratches or small gaps on the surfaces of bearing box 11a in contact with bearing cover 51. The stratified elastic edges of ring-shaped projections 51c contact the inner periphery of bearing box 11a in several layers, so that very effective water sealing can be provided. If a force to remove bearing cover 51 from bearing box 11a is applied backward, the outer periphery of ring-shaped projections 51c expands to oppose the removing force.

After bearing cover 51 is fitted to bearing box 11a, the inclination of ring-shaped projections 51c urges bearing cover 51 forward (toward the deep inside of bearing box 11a). Therefore, bearing cover 51 is prevented from dropping out of bearing box 11a. Even if internal pressure of the rotary electric machine increases to urge bearing cover backward, ring-shaped projections 51c generates a repulsion force to retain bearing cover 51 at the fixed position.

Bottom 51b of bearing cover 51 is thinner than the peripheral wall of hollow cylindrical portion 51a so that the bottom 51b can expand as the internal pressure of starter motor 1 increases, thereby to moderate the internal pressure.

A space is formed between the edges of the ring-shaped projections 51c and the rear portion of hollow cylindrical portion 51a so that a screwdriver can be inserted in the space to pry the space open wider. Thus, bearing cover 51 can be removed from bearing box 11a easily in a very short time.

As a first variation of starter motor 1 according to embodiment 1, ring-shaped projections 51c may have edges having flat contact surfaces instead of sharp triangular edge.

Figure 4:
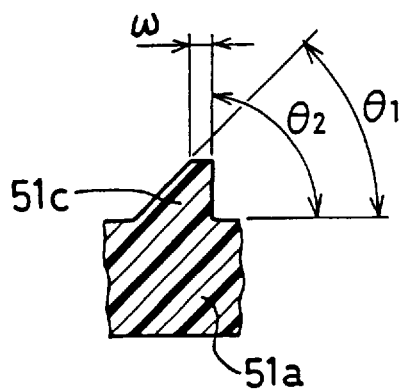
FIG. 4 is a fragmentary cross-sectional view illustrating a ring-shaped projection of a bearing cover according to a first variation of the first embodiment.

As shown in FIG. 4, the flat contact surface of ring-shaped projection 51c has width of ω, and axial thickness of the base portion of ring-shaped projection 51c is larger than that of the first embodiment. Accordingly, the volume of ring-shaped projection 51c becomes larger, and the repulsion force thereof becomes larger when contracting. As a result, bearing cover 51 becomes more difficult to drop out of bearing box 11a.

When bearing cover 51 is removed from bearing box 11a, there is less chance to have damage on the flat and thick edges of ring-shaped projections 51c.

Therefore, bearing cover 51 is supported in the bearing box 11a more securely. In addition, bearing cover 51 can be removed more easily.

As a second variation of starter motor 1 according to the first embodiment, ring-shaped projections 51c may have edges having round contact surfaces instead of the sharp triangular edge.

Figure 5:
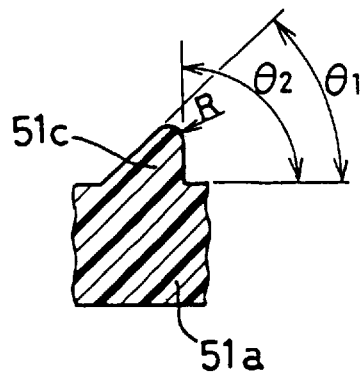
FIG. 5 is a fragmentary cross-sectional view illustrating a ring-shaped projection of a bearing cover according to a second variation of the first embodiment.

As shown in FIG. 5, the round surface having radius R is formed at the contact surface of the edge, and axial thickness of the base portion of ring-shaped projection 51c is larger than that of the first embodiment. Accordingly, the volume of ring-shaped projection 51c becomes larger, and the repulsion force thereof when it contracts becomes larger. As a result, bearing cover 51 becomes more difficult to drop out of bearing box 11a.

When bearing cover 51 is removed from bearing box 11a, there is less chance to have damage on the round and thick edges of ring-shaped projections 51c. Therefore, it is easy to remove bearing cover 51.

In addition, because ring-shaped projections 51c have smooth round-edges, the mold die for molding bearing cover 51 can be easily provided at a low cost.

Bearing cover 51 of starter motor 1 according to a third variation of the first embodiment has a plurality of flange-like ring-shaped projections.

Figure 6:
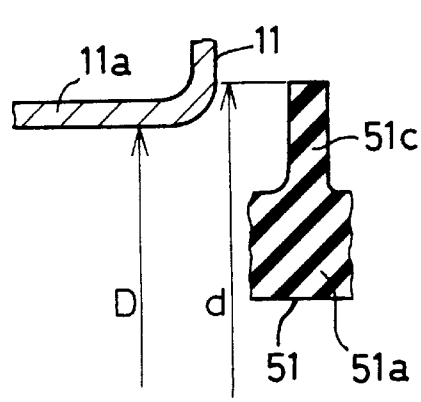
FIG. 6 is a fragmentary cross-sectional view illustrating a ring-shaped projection of a bearing cover according to a third variation of the first embodiment.

As shown in FIG. 6, each ring-shaped projection 51c has a flange-like member of an even thickness and a belt-like outer periphery. The outside diameter d of ring-shaped projections 51c is much larger than the inside diameter D of bearing box 11a. Each ring-shaped projection 51c has a base portion that gradually rises from hollow cylindrical portion 51a to have a suitable radius in cross-section at the corner between the base portion and hollow cylindrical portion 51a. Therefore, the base portion is prevented from cracking.

Figure 7:
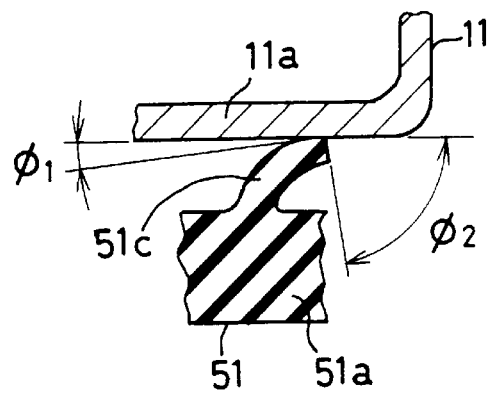
FIG. 7 is a fragmentary cross-sectional view illustrating a ring-shaped projection of a bearing cover according to a third variation of the first embodiment.

As shown in FIG. 7, when bearing cover 51 is fitted into bearing box 11a, the flange-like member of ring-shaped projection 51c elastically bend backward. As a result, bearing cover 51 can be easily fitted into bearing box 11a under a small pressure.

While bearing cover 51 is disposed in bearing box 11a, ring-shaped projections elastically bend backward in a backward-inclined shape. Accordingly, the front contact angle of the edge of ring-shaped projection 51c is φ1, which is nearly zero, and the rear contact angle thereof is φ2, which is nearly 90°. Therefore, ring-shaped projections 51c urge bearing cover 51 forward under vibration and prevent bearing cover 51 from dropping out of bearing box 11a. Even if the internal pressure of starter motor increases, bearing cover 51 would deform and slightly move to absorb the pressure.

When bearing cover 51 is intentionally removed from bearing box 11a, bearing cover is pulled backward under a pressure that is larger than normal pressure. Then, the backward-inclining ring-shaped projections 51c turn over to incline forward. Accordingly, the reaction of ring-shaped projections 51c to the pulling force much decreases, so that bearing cover 51 can be removed by a small pulling force. If the bearing cover 51 is pulled strongly at first, it can be removed smoothly thereafter.

Starter motor 1 according to a fourth variation of the first embodiment has soft-resin-made bearing cover 51 instead of rubber-made bearing cover 51. The best soft resin is the elastomer that is a blend of a thermoplastic resin such as nylon or polypropylene and synthetic rubber.

This variation can be applied not only to the above embodiment 1 but also to other variations to have an effect corresponding to the specific effects thereof.

If this is applied to the third embodiment, the outside diameter d of ring-shaped projections 51c of bearing cover 51 should be made a little larger than the inside diameter D of bearing box 11a (as shown in FIG. 6). Thus, ring-shaped projections 51c merely incline inside bearing box 11a to provide almost the same effect as the third embodiment.

Figure 8:
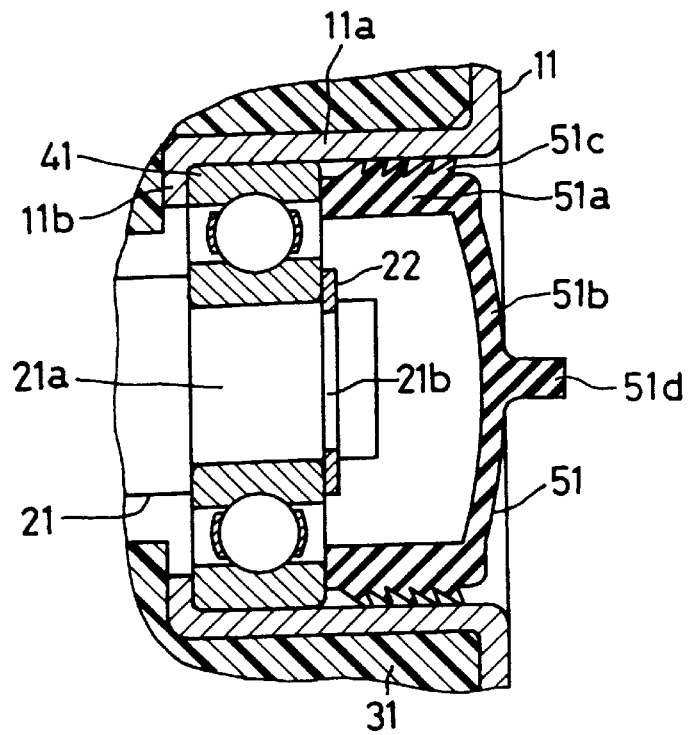
FIG. 8 is a cross-sectional view of a main portion of a starter motor according to a second embodiment of the invention.

A rotary electric machine according to a second embodiment of the invention is almost the same starter motor 1 as embodiment 1 except bearing cover 51 that has a knob projecting backward therefrom, as shown in FIG. 8.

A columnar knob 51b projects backward from the center of bottom 11b of bearing cover 51. Bearing cover 51 is the same unitary rubber member as first embodiment 1. Knob 51d is formed of a runner that is incidentally formed at the gate of a mold die when bearing cover 51 is molded out.

The runner should be made comparatively thicker and longer than a usual runner so as to form knob 51d. In addition, the runner should be designed so that the base portion of knob 51d is chamfered to prevent the base portion from being cut off.

If knob 51d is pulled by hand or a tool such as a pair of pliers, bearing cover 51 can be removed from bearing box 11a under suitable pulling force.

It is possible to apply the above described various variations to starter motor 1 according to the second embodiment.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A rotary electric machine, comprising:
   a frame having a concave bearing box having a smooth inner periphery at a rear center thereof;
   a stator fixed to said frame;
   a rotor disposed inside said frame and rotatably supported by said frame;
   a bearing fitted to said inner periphery of said bearing box to support a rear portion of a rotor shaft;
   a bearing cover, fitted to said inner periphery of said bearing box at the rear of said bearing, for covering a rear portion of said bearing, wherein said bearing cover comprises a cup-shaped unitary member made of rubber having a hollow cylindrical portion, a plurality of elastically contracted ring-shaped projections with stratified elastic edges on the periphery thereof in close contact with the inner periphery of said bearing box and a bottom for sealing said hollow cylindrical portion, and wherein said plurality of ring-shaped projections has spaces between said stratified elastic edges.

2. The rotary electric machine as claimed in claim 1, wherein
   said plurality of ring-shaped projections incline backward.

3. The rotary electric machine as claimed in claim 1, wherein
   said bottom is thinner than the peripheral wall of said hollow cylindrical portion.

4. The rotary electric machine as claimed in claim 1, wherein
   said bearing cover has a knob projecting backward therefrom.

5. The rotary electric machine as claimed in claim 1, wherein said bearing cover is disposed not to project rearward from said frame.

6. The rotary electric machine as claimed in claim 1, wherein each of said plurality of ring-shaped projections has a triangular cross-section having a backward inclining side.

7. A rotary electric machine, comprising:
   a frame having a concave bearing box having a smooth inner periphery at a rear center thereof;
   a stator fixed to said frame;
   a rotor disposed inside said frame and rotatably supported by said frame;
   a bearing fitted to said inner periphery of said bearing box to support a rear portion of a rotor shaft;

a bearing cover, fitted to said inner periphery of said bearing box at the rear of said bearing, for covering a rear portion of said bearing, wherein said bearing cover comprises a cup-shaped unitary member made of soft resin having a hollow cylindrical portion, a plurality of elastically contracted ring-shaped projections on the periphery thereof in close contact with the inner periphery of said bearing box and a bottom for sealing said hollow cylindrical portion, and wherein said plurality of ring-shaped projections has spaces between said stratified elastic edges.

8. The rotary electric machine as claimed in claim 7, wherein the bearing cover is made of an elastomer that is a blend of a thermoplastic resin and synthetic rubber, wherein the thermoplastic resin is at least one of nylon and polypropylene.

* * * * *